United States Patent
Kitanaka et al.

(10) Patent No.: US 11,975,616 B2
(45) Date of Patent: May 7, 2024

(54) ELECTRIC VEHICLE DRIVE SYSTEM AND METHOD FOR PROTECTING ELECTRIC VEHICLE CONTROL APPARATUSES

(71) Applicant: Mitsubishi Electric Corporation, Tokyo (JP)

(72) Inventors: Hidetoshi Kitanaka, Tokyo (JP); Tetsuo Sugahara, Tokyo (JP); Hirokazu Takabayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 105 days.

(21) Appl. No.: 17/596,903

(22) PCT Filed: Jul. 4, 2019

(86) PCT No.: PCT/JP2019/026657
§ 371 (c)(1),
(2) Date: Dec. 21, 2021

(87) PCT Pub. No.: WO2021/001997
PCT Pub. Date: Jan. 7, 2021

(65) Prior Publication Data
US 2022/0314806 A1 Oct. 6, 2022

(51) Int. Cl.
*B60L 3/00* (2019.01)
*B60L 9/18* (2006.01)
(Continued)

(52) U.S. Cl.
CPC ............... *B60L 3/0084* (2013.01); *B60L 9/18* (2013.01); *B60L 9/24* (2013.01); *H02P 27/06* (2013.01); *B60L 2200/26* (2013.01)

(58) Field of Classification Search
CPC .. B60L 3/0084; B60L 9/18; B60L 9/24; B60L 2200/26; B60L 9/005; B60L 9/22; H02P 27/06; Y02T 10/72
(Continued)

(56) References Cited

U.S. PATENT DOCUMENTS 4,904,918 A * 2/1990 Bailey ...................... H02P 3/18
363/39
6,477,965 B2 11/2002 Yamaguchi et al.
(Continued)

FOREIGN PATENT DOCUMENTS

JP H03261307 A * 11/1991 ............... B60L 9/18
JP H03261307 A 11/1991
(Continued)

OTHER PUBLICATIONS

Office Action dated Jun. 28, 2022, issued in corresponding Japanese Patent Application No. 2021-529659, 7 pages including 4 pages of English Translation.
(Continued)

*Primary Examiner* — Hal Kaplan
*Assistant Examiner* — Swarna N Chowdhuri
(74) *Attorney, Agent, or Firm* — BUCHANAN INGERSOLL & ROONEY PC (57) ABSTRACT

An electric vehicle drive system includes: a reactor; and electric vehicle control apparatuses that control electric motors for driving an electric vehicle. Each of the electric vehicle control apparatuses includes: a capacitor that defines a filter circuit together with the reactor; an inverter circuit that supplies power to the corresponding one of the electric motors; and a control unit that controls the inverter circuit. The inverter circuit is housed in a housing together with the capacitor and the control unit. The reactor is connectable to each of the housings through an electric wire having any
(Continued)

desired length. At least one of the electric wires connecting the reactor and the housings has a length of 2 meters or more.

10 Claims, 8 Drawing Sheets

(51) Int. Cl.
   *B60L 9/24* (2006.01)
   *H02P 27/06* (2006.01)
(58) Field of Classification Search
   USPC .................................................. 307/10.1, 9.1
   See application file for complete search history.

(56) References Cited

U.S. PATENT DOCUMENTS

| 2004/0227036 A1* | 11/2004 | Arita | H04B 3/60 |
| | | | 246/10 |
| 2010/0237821 A1 | 9/2010 | Kitanaka | |
| 2012/0063176 A1 | 3/2012 | Yamasaki et al. | |

FOREIGN PATENT DOCUMENTS

| JP | H0970102 A | | 3/1997 |
| JP | 2001258263 A | | 9/2001 |
| JP | 2006203969 A | | 8/2006 |
| JP | 2006271029 | * | 10/2006 |
| JP | 2006271029 A | | 10/2006 |
| JP | 4065901 B1 | | 3/2008 |
| JP | 4614020 B1 | | 1/2011 |
| JP | 2015065732 | * | 4/2015 |
| JP | 2015065732 A | | 4/2015 |
| KR | 930007714 | * | 8/1993 |

OTHER PUBLICATIONS

Office Action issued in corresponding Japanese Patent Application No. 2021-529659, dated Apr. 4, 2023, 11 pages including 7 pages of English translation.
Office Action dated May 6, 2022, issued in corresponding Indian Patent Application No. 202127061214, 6 pages.
International Search Report (PCT/ISA/210) with English translation and Written Opinion (PCT/ISA/237) dated Oct. 1, 2019, by the Japan Patent Office as the International Searching Authority for International Application No. PCT/JP2019/026657.
Notice of Reasons for Refusal dated Feb. 1, 2022, issued in corresponding Japanese Patent Application No. 2021-529659, 6 pages including 4 pages of English Translation.
Notice of Reasons for Refusal dated Nov. 28, 2023, issued in the corresponding Japanese Patent Application No. 2021-529659, 9 pages including 5 pages of English Translation.

* cited by examiner

ELECTRIC VEHICLE DRIVE SYSTEM AND METHOD FOR PROTECTING ELECTRIC VEHICLE CONTROL APPARATUSES

FIELD

The present invention relates to an electric vehicle drive system including a plurality of electric vehicle control apparatuses that control electric motors that drive an electric vehicle, and a method for protecting the electric vehicle control apparatuses.

BACKGROUND

An electric vehicle control apparatus of an electric vehicle drive system, which operates upon receiving the power from an overhead line or a power storage device, is often installed on a roof or under a floor of an electric vehicle. The electric vehicle control apparatus includes a filter circuit and an inverter circuit. The filter circuit includes a reactor and a capacitor. The inverter circuit includes semiconductor elements, and is disposed at a stage subsequent to the filter circuit. The inverter circuit is connected to an electric motor for travelling of the electric vehicle. DC power is supplied to the inverter circuit. Switching operations of the semiconductor elements of the inverter circuit convert the DC power into a desired AC power. The thus obtained AC power is supplied to the electric motor to drive the electric motor.

Patent Literature 1 below describes components such as a reactor, a capacitor, and an inverter circuit housed in the same housing. For the conventional configuration, that is, the main components of an electric vehicle control apparatus are located close to one another and installed on an electric vehicle.

CITATION LIST

Patent Literature

Patent Literature 1: Japanese Patent Application Laid-open No. 2001-258263

SUMMARY

Technical Problem

The electric vehicle has limited spaces on the roof and under the floor. In some case, such limited spaces are insufficient for installing the housing of the electric vehicle control apparatus. In such a case, it is necessary to downsize the components and reduce the size of the housing by, for example, changing the specifications of the electric vehicle control apparatus. A possible disadvantage of the revision to the specifications is that the function or performance of the electric vehicle gets worse than the initial level.

The present invention has been made in view of the above, and an object of the present invention is to obtain an electric vehicle drive system that enables electric vehicle control apparatuses to be flexibly arranged in a limited space of an electric vehicle.

Solution to Problem

In order to solve the above-described problem and achieve the object, the present invention provides an electric vehicle drive system including: a reactor; and a plurality of electric vehicle control apparatuses that controls electric motors to drive an electric vehicle. Each of the electric vehicle control apparatuses includes: a capacitor connected to the reactor, the capacitor and the reactor define a filter circuit; an inverter circuit that supplies power to the electric motor, the inverter circuit being connected to the filter circuit; and a control unit that controls the inverter circuit. The inverter circuit is housed in a housing together with the capacitor and the control unit. The reactor is connectable to each of a plurality of the housings through an electric wire having any desired length. At least one of the electric wires interconnecting the reactor and the housings has a length of 2 meters or more.

Advantageous Effects of Invention

The electric vehicle drive system according to the present invention achieves the effect of enabling the electric vehicle control apparatuses to be flexibly arranged in a limited space of the electric vehicle.

DESCRIPTION OF EMBODIMENTS

An electric vehicle drive system and a method for protecting electric vehicle control apparatuses according to each embodiment of the present invention will be hereinafter described in detail with reference to the accompanying drawings. Note that the present invention is not limited to the following embodiments. In addition, the reduction scale of each unit may be different from the actual one in the accompanying drawings. The dimensional ratio of each unit may also differ between the drawings. Furthermore, in the following description, electrical connection and physical connection are simply referred to as "connection" without being distinguished from each other.

First Embodiment

Figure 1:
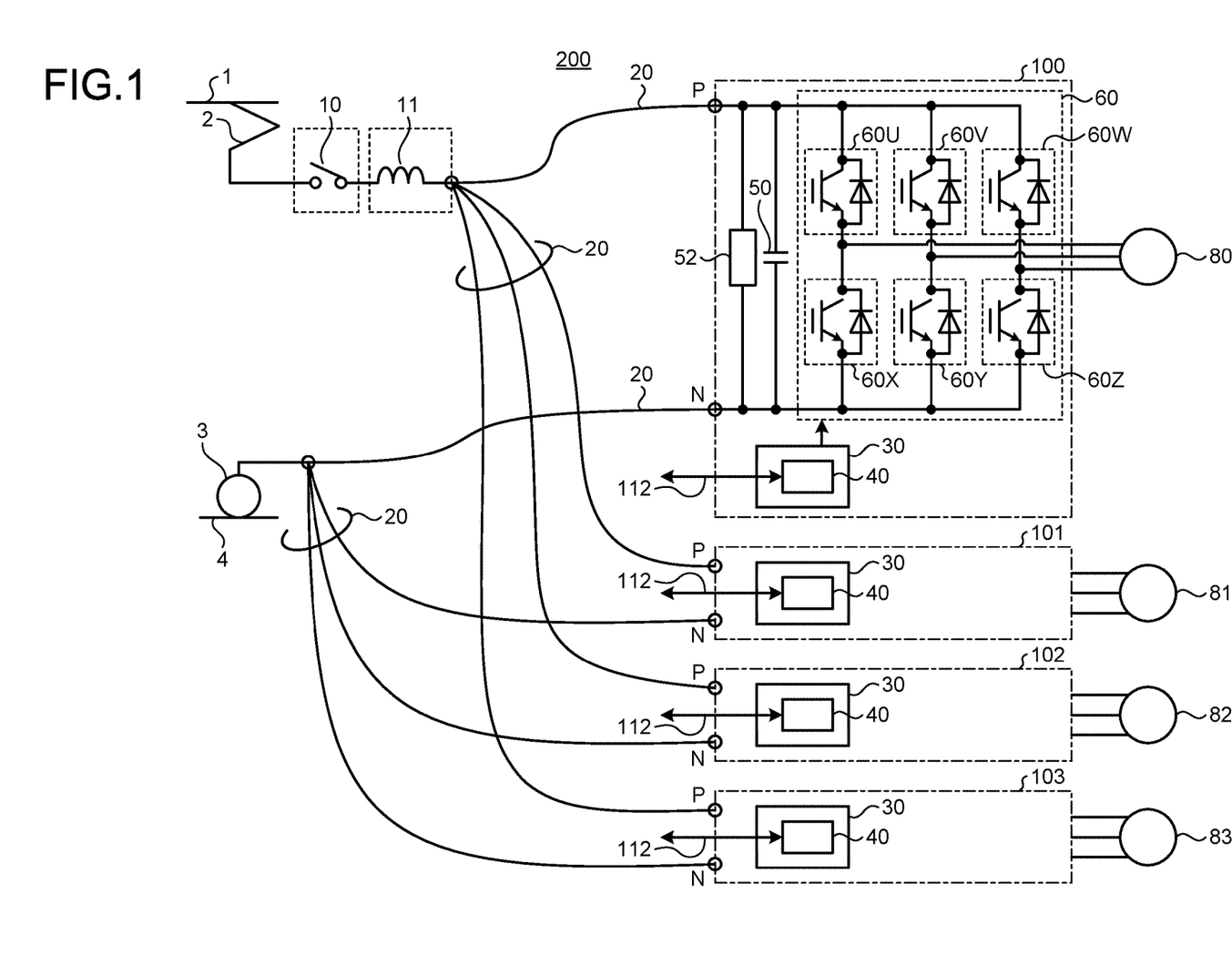
FIG. 1 is a diagram showing an example configuration of an electric vehicle drive system according to a first embodiment.

FIG. 1 is a diagram showing an example configuration of an electric vehicle drive system according to a first embodiment. As illustrated in FIG. 1, an electric vehicle drive system 200 includes a plurality of electric vehicle control apparatuses 100, 101, 102, and 103 (hereinafter, expressed as "100 to 103" as appropriate) that receives DC power from an overhead line 1 via a current collector 2. There is a substation (not illustrated) beyond the overhead line 1, and the overhead line 1 is regarded as an external power supply when viewed from the electric vehicle control apparatuses 100 to 103. Note that an overhead line voltage, which is the voltage of the overhead line 1 to be applied to the current collector 2, and the conversion capacity of each of the electric vehicle control apparatuses 100 to 103 vary depending on a method for driving the electric vehicle drive system. The overhead line voltage ranges from approximately 600 to 3,000 [V]. In addition, the conversion capacity ranges from several tens to several hundreds of kilovolt-amperes.

Electric motors 80, 81, 82, and 83 (hereinafter, expressed as "80 to 83" as appropriate) for driving an electric vehicle are connected to the electric vehicle control apparatuses 100 to 103, respectively. The DC power supplied from the overhead line 1 and the current collector 2 is supplied to the electric vehicle control apparatuses 100 to 103 via a switch 10, a reactor 11, and electric wires 20. Each positive terminal P of the electric vehicle control apparatuses 100 to 103 is connected to the reactor 11. In addition, each negative terminal N of the electric vehicle control apparatuses 100 to 103 is connected to rails 4 via wheels 3. As a result, direct current of the DC power supplied from the overhead line 1 flows through the switch 10, the reactor 11, the electric wires 20, the electric vehicle control apparatuses 100 to 103, the electric motors 80 to 83, the wheels 3, and the rails 4, and returns to the substation. In the configuration of FIG. 1, the reactor 11, the electric wires 20, and the electric vehicle control apparatuses 100 to 103 are define elements of the electric vehicle drive system 200. Note that the electric wire 20 includes a conductor such as copper or aluminum. Examples of the conductor includes a bus bar.

Note that, in FIG. 1, an overhead conductor is illustrated as the overhead line 1, and a pantograph current collector is illustrated as the current collector 2, but the overhead line 1 and the current collector 2 are not limited thereto. The overhead line 1 can be a third rail used in subways, for example, and a current collector for the third rail may be used as the current collector 2 accordingly. Furthermore, although FIG. 1 illustrates the overhead line 1 as a DC overhead line, the overhead line 1 can be instead an AC overhead line. Note that when the overhead line 1 is an AC overhead line, a transformer is provided between the current collector 2 and the switch 10 or between the switch 10 and the reactor 11, and a converter is provided at a stage subsequent to the transformer. The transformer is provided for stepping down a received AC voltage. The converter converts an AC voltage output from the transformer, into a DC voltage.

The electric vehicle control apparatus 100 includes a capacitor 50, a discharge circuit 52, and an inverter circuit 60. The capacitor 50 holds a DC voltage. The discharge circuit 52 discharges the voltage of the capacitor 50. The capacitor 50 and the discharge circuit 52 are located between and connected to the positive terminal P and the negative terminal N within the electric vehicle control apparatus 100. The capacitor 50 and the discharge circuit 52 are connected in parallel to both ends of the inverter circuit 60 on the input side of the inverter circuit 60.

The capacitor 50 is connected to the reactor 11, and the capacitor 50 and the reactor 11 define an LC filter circuit. The LC filter circuit reduces a surge voltage flowing in from a side of the overhead line 1. Furthermore, the LC filter circuit is connected to the inverter circuit 60, and reduces the magnitude of a ripple component of current flowing through the inverter circuit 60.

The inverter circuit 60 included in the electric vehicle control apparatus 100 is a power conversion circuit that supplies power to the electric motors 80 to 83. The inverter circuit 60 converts the DC voltage of the capacitor 50 into an AC voltage of any desired frequency having any desired voltage value, and applies the AC voltage to the electric motors 80 to 83.

As illustrated in FIG. 1, the inverter circuit 60 includes six semiconductor elements 60U, 60V, 60W, 60X, 60Y, and 60Z. The semiconductor elements 60U, 60V, 60W, 60X, 60Y, and 60Z, which are bridge-connected to one another, define a three-phase bridge circuit.

In the inverter circuit 60, the semiconductor elements 60U, 60V, and 60W are referred to as positive arms, and the semiconductor elements 60X, 60Y, and 60Z are referred to as negative arms. In addition, a set of the positive arm and the negative arm connected in series is referred to as a leg. The semiconductor elements 60U and 60X define a U-phase leg, the semiconductor elements 60V and 60Y define a V-phase leg, and the semiconductor elements 60W and 60Z define a W-phase leg. An insulated gate bipolar transistor (IGBT) element including an anti-parallel diode as illustrated in the drawing is suitable for the semiconductor elements 60U, 60V, 60W, 60X, 60Y, and 60Z. Note that a metal-oxide-semiconductor field-effect transistor (MOSFET) can be used instead of the IGBT element.

Each of the electric vehicle control apparatuses 100 to 103 includes a control unit 30. The control unit 30 generates a PWM signal for performing PWM control on the semiconductor elements 60U, 60V, 60W, 60X, 60Y, and 60Z of the inverter circuit 60, and provides the PWM signal to the inverter circuit 60. The control unit 30 in the first embodiment includes a cooperative control unit 40. The cooperative control unit 40 transmits and receives a cooperation signal 112 to and from the cooperative control unit 40 of another electric vehicle control apparatus, and performs cooperative control as will be described below. In addition, the cooperative control unit 40 shares information with the cooperative control units 40 of other electric vehicle control apparatuses.

Figure 2:
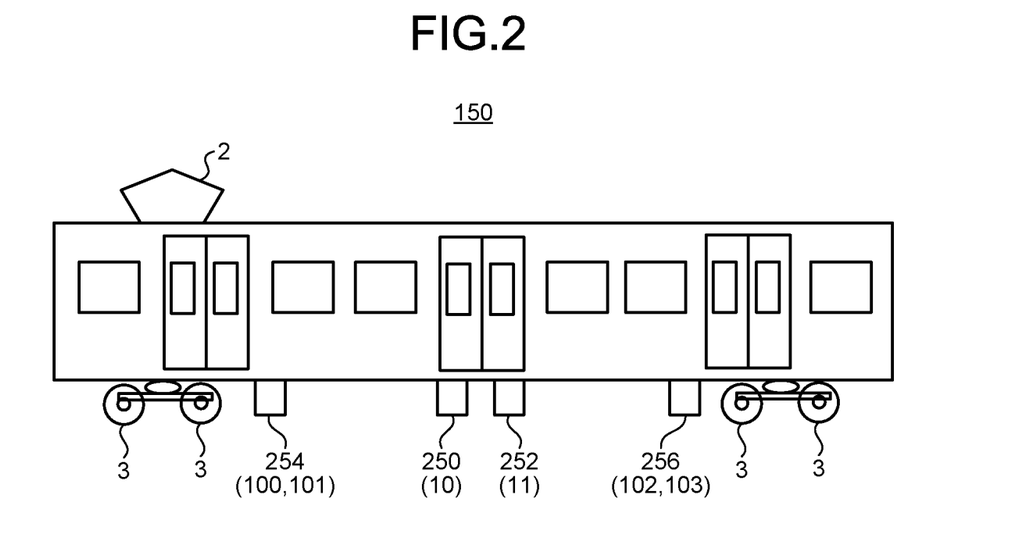
FIG. 2 is a diagram showing an example of installing the electric vehicle drive system according to the first embodiment on an electric vehicle.
Figure 3:
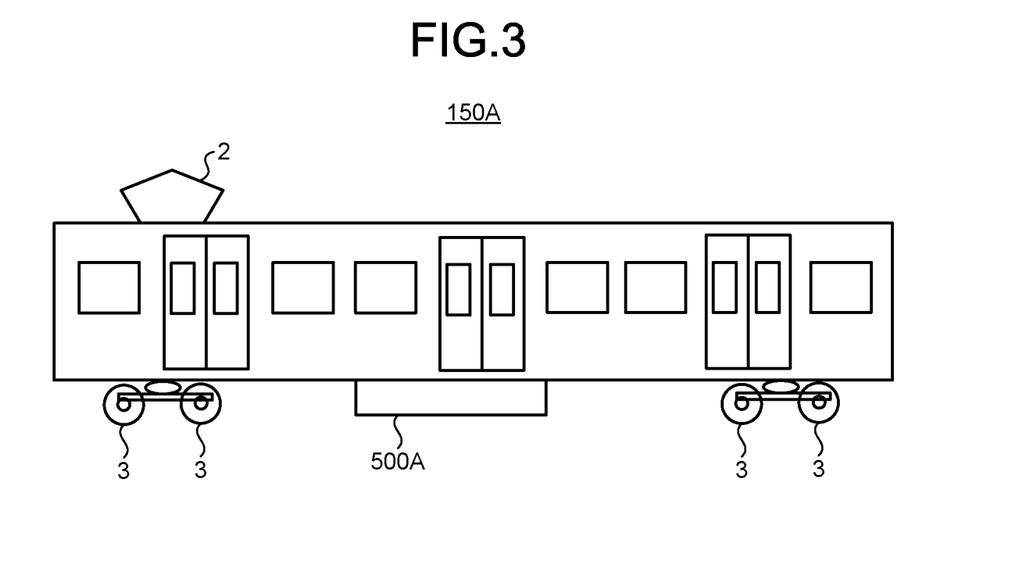
FIG. 3 is a diagram showing an example conventional installation for comparison with the example shown in FIG. 2.

FIG. 2 is a diagram showing an example of installing the electric vehicle drive system according to the first embodiment on an electric vehicle. FIG. 3 is a diagram showing an example conventional installation for comparison with the example shown in FIG. 2. Note that components common to FIGS. 1 to 3 are denoted by the same reference numerals.

Conventionally, as illustrated in FIG. 3, a housing 500A including all the components of an electric vehicle drive system is installed under the floor of an electric vehicle 150A. Except for the housing 500A, no devices installed under the floor are illustrated in FIG. 3. However, the electric vehicle 150A is practically equipped with various devices necessary for its operation. A single electric vehicle 150A has a length of about 20 m. Furthermore, the length of the housing 500A along the length of the electric vehicle 150A is less than 2 m at the maximum.

It is difficult to reduce or downsize existing devices other than the housing 500A installed on the electric vehicle 150A. For this reason, the housing 500A is required to be downsized so as to be accommodated in an allowable space every time a function is added, or ensure a vacant space as much as possible. In downsizing the housing 500A, in some case, the specifications of the devices are changed. For example, the conversion capacity of an inverter circuit is reduced to reduce the size of parts. As a result, the size of the housing 500A can be reduced. At this time, in some case, the function or performance of the electric vehicle gets worse than the initial level.

Meanwhile, in the first embodiment, the components of the electric vehicle drive system 200 are dispersedly located under the floor of an electric vehicle 150. Specifically, in the configuration illustrated in FIG. 2, a housing 250 equipped with the switch 10 and a housing 252 equipped with the reactor 11 are disposed in a central portion under the floor. In addition, a housing 254 equipped with the electric vehicle control apparatuses 100 and 101 and a housing 256 equipped with the electric vehicle control apparatuses 102 and 103 are disposed near the wheels 3 located away from the central portion under the floor. That is, in the first embodiment, not all the components of the electric vehicle drive system 200 are housed in a single housing. Instead, the components of the electric vehicle drive system 200 are separately housed in several housings. As a result, the number of housings is increased. However, the size of each housing is reduced, so that it is possible to effectively use a vacant space under the floor for disposing the housings. This makes it possible to install the apparatuses on the electric vehicle 150 while preventing deterioration in function or performance of the apparatuses. Note that there is a case where the reactor 11 is not housed in any housing. In such a case, each of the housings 254 and 256 is simply referred to as a "housing".

Note that in order to achieve a configuration as illustrated in FIG. 2, the housings equipped with the components of the electric vehicle drive system 200 need to be connected to one another by the electric wires 20 that are connection conductors. The length of at least one of the electric wires 20 interconnecting the housings, which is equal to or larger than the length of the housing 500A along the length of the electric vehicle 150A of the conventional configuration, is 2 m or more. As described above, a single electric vehicle 150 has a length of about 20 m. The housings equipped with the components of the electric vehicle drive system 200 are connected to one another by the electric wires 20 that are connection conductors each having any desired length. As a result, it is possible to effectively use a vacant space under the floor for disposing the housings.

Meanwhile, it is necessary to consider a circuit configuration so as to drive the electric vehicle smoothly and stably as well as to connect the housings equipped with the components of the electric vehicle drive system 200 by using the electric wires 20 that are connection conductors each having any desired length. As various devices necessary for operation of the electric vehicle are installed under the floor of the electric vehicle 150, it is difficult to linearly lay the electric wire 20. It is therefore expected that the electric wire 20 should have a one way length of a dozen meters at the maximum. When the electric wire 20 is large in length, a resonance circuit is formed of circuit elements including the impedance of the electric wire 20 and the capacitor 50 in each electric vehicle control apparatus. With such a resonance circuit formed, electric oscillation occurs between these circuit elements. As a result, the voltage of the capacitor 50 becomes oscillatory, and the electric vehicle control apparatuses 100 to 103 can fail to operate normally. This phenomenon will be hereinafter described.

Figure 4:
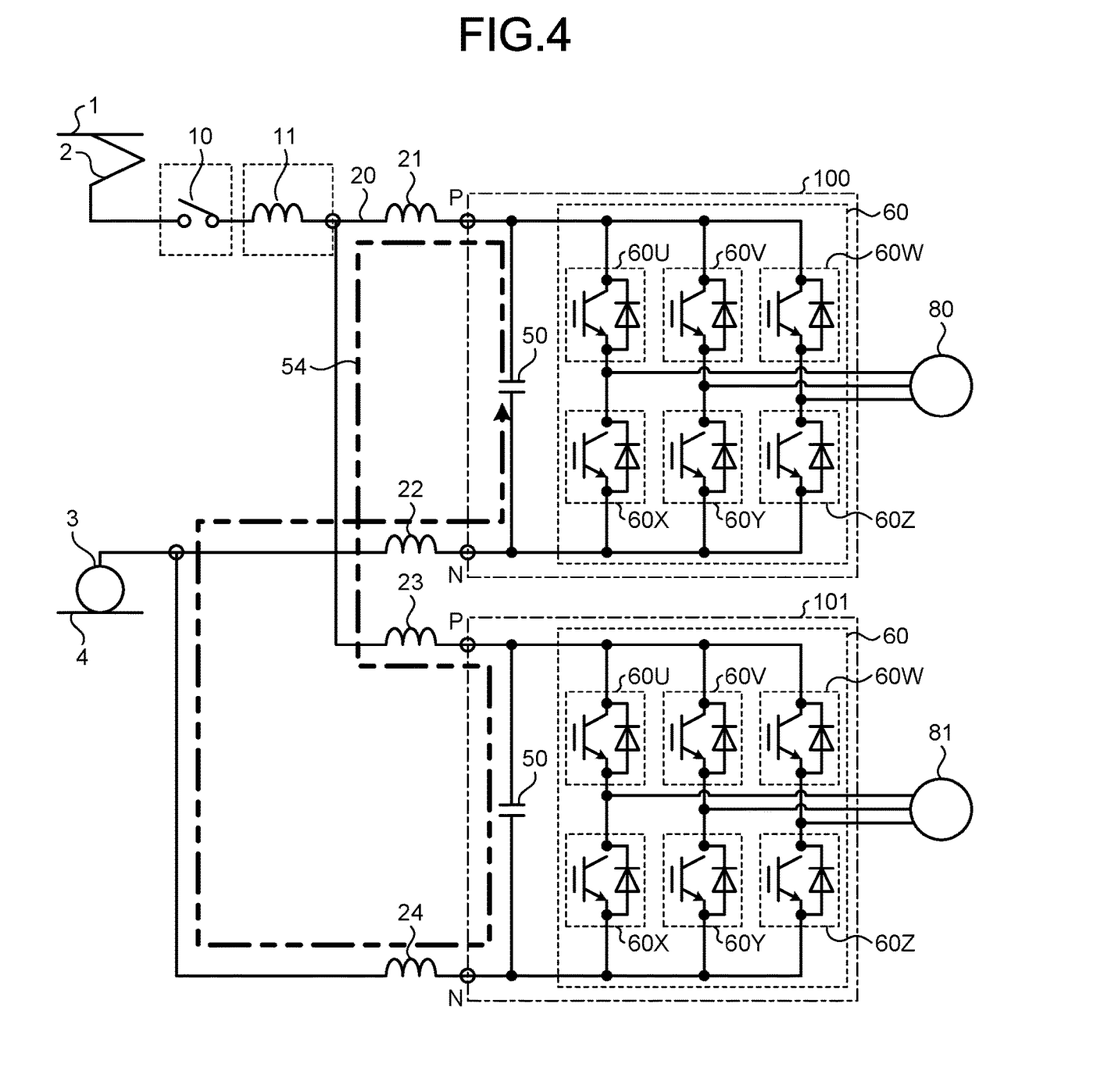
FIG. 4 is a diagram illustrating a resonance path that can occur in the electric vehicle drive system according to the first embodiment.

FIG. 4 is a diagram illustrating a resonance path that can occur in the electric vehicle drive system according to the first embodiment. Among the electric vehicle control apparatuses 100 to 103 included in the electric vehicle drive system 200, only the electric vehicle control apparatuses 100 and 101 are illustrated in FIG. 4 for convenience of description. In addition, the individual impedances of the electric wires 20, which can each have a one way length of a dozen meters at the maximum, are collectively represented as inductances 21, 22, 23, and 24 (hereinafter, expressed as "21 to 24" as appropriate). A resonance circuit 54 having a path passing through the inductances 21 to 24 and the two capacitors 50 and 50 is formed as indicated by a two-dot chain line. As a result, the voltages of the two capacitors 50 and 50 become oscillatory, and are equal to a normal DC voltage having an oscillating component superposed thereon. When the oscillating component becomes larger, the capacitor voltage becomes an overvoltage. As a result, the corresponding electric vehicle control apparatus can fail to continue its normal operation as an overvoltage detection function works. In order to smoothly and stably drive the electric vehicle, therefore, it is necessary to reduce electric oscillation that occurs in the resonance circuit 54.

Next, some matters to be attended to, methods, or means for reducing electric oscillation caused by the resonance circuit 54 will be described.

(Location of Capacitor 50)

Assume that the capacitor 50 is built into the electric vehicle control apparatus 100. This enables the control unit 30 to can easily detect a voltage across the capacitor 50. When the voltage of the capacitor 50 becomes an overvoltage, the electric charge of the capacitor 50 having the overvoltage applied thereto is released through the discharge circuit 52 connected in parallel to the capacitor 50. As a result, the electric vehicle control apparatuses 100 to 103 can individually reduce fluctuation in the voltages of the capacitors 50, thereby stabilizing the operation of the entire electric vehicle drive system 200.

(Capacitance of Capacitor 50)

In a case where the capacitances of a plurality of parallel-connected capacitors are different from one another, a drop in the voltage of a capacitor having a smaller capacitance is larger than a drop in the voltage of a capacitor having a larger capacitance when these capacitors release the same quantity of electric charge. As a result, a voltage difference occurs between the capacitors 50 having the different capacitances even when the electric motors 80 to 83 consume the same amount of power. Such a voltage difference causes electric oscillation. In addition, the deterioration of a capacitor having a small capacitance progresses, and the voltage of such a deteriorated capacitor more fluctuates, which is a vicious cycle. In view of this, the capacitors 50 are preferably equal to one another in capacitance. Note that capacitors to be used in an electric vehicle drive system generally have an error of about ±10% even when the capacitors are designed to have the same capacitance. The term "the same capacitance, as used herein means that the capacitance value of each capacitor 50 is in the range of +10%.

(Voltage Oscillation Reducing Function)

Figure 5:
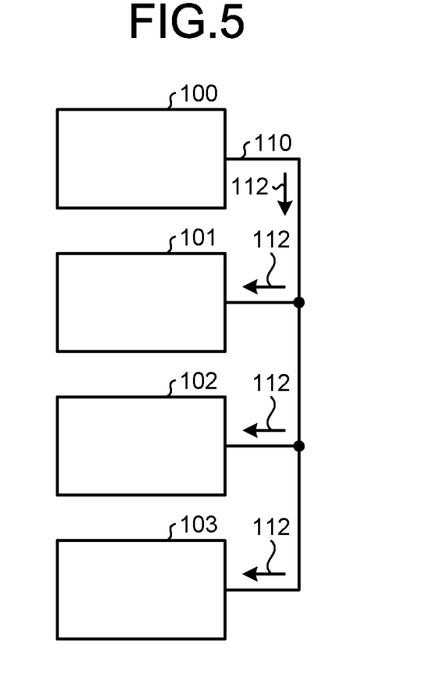
FIG. 5 is a diagram illustrating a flow of a cooperation signal in the first embodiment.
Figure 6:
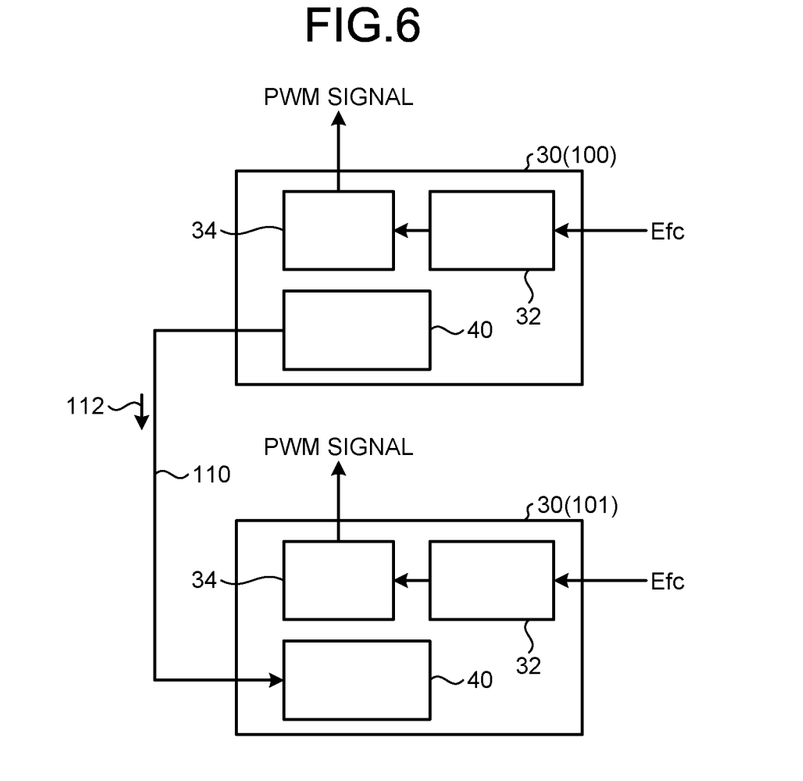
FIG. 6 is a diagram illustrating configurations of control units that embody a voltage oscillation reducing function in the first embodiment.
Figure 7:
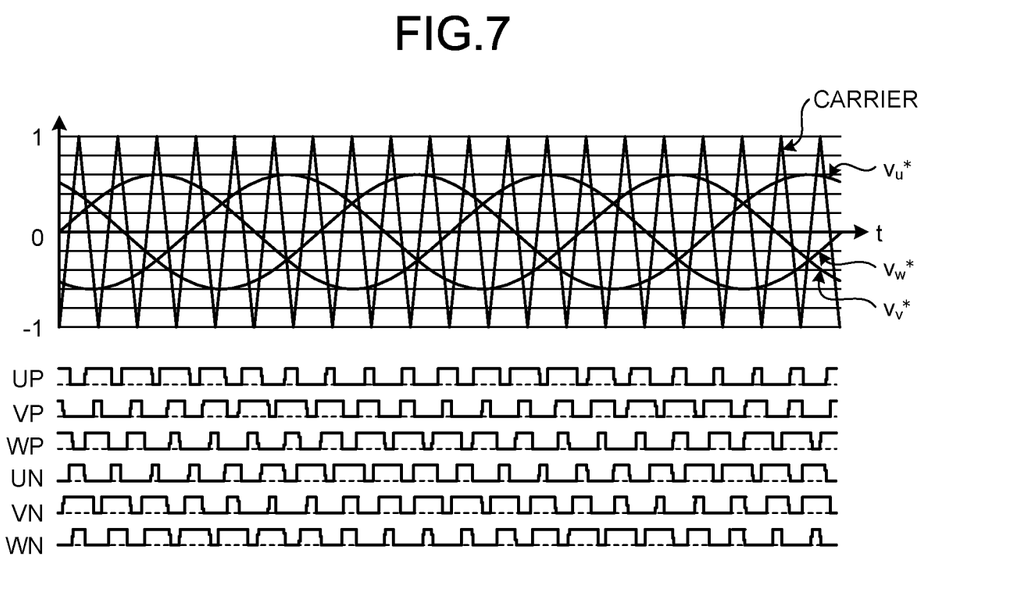
FIG. 7 is a diagram illustrating operation waveforms of when each vector control unit illustrated in FIG. 6 generates a pulse width modulation (hereinafter abbreviated as "PWM") signal.

First, a voltage oscillation reducing function in the first embodiment will be described with reference to FIGS. 5 to 7. FIG. 5 is a diagram illustrating a flow of a cooperation signal in the first embodiment. FIG. 6 is a diagram illustrating configurations of the control units that embody the voltage oscillation reducing function in the first embodiment. FIG. 7 is a diagram illustrating operation waveforms of when each vector control unit illustrated in FIG. 6 generates a PWM signal.

As illustrated in FIG. 5, the electric vehicle control apparatuses 100 to 103 in the first embodiment are connected to one another by a communication line 110. FIG. 5 shows an example in which the electric vehicle control apparatus 100 serves as a master apparatus that has centralized control over the electric vehicle drive system 200. The above-described cooperation signal 112 is transmitted from the electric vehicle control apparatus 100 to each of the electric vehicle control apparatuses 101 to 103.

Note that the connection illustrated in FIG. 5 is an example, and connection is not limited to this example. Any connection form may be adopted as long as the cooperation signal 112 generated by the electric vehicle control apparatus 100 serving as the master apparatus can be transmitted to each of the electric vehicle control apparatuses 101 to 103. In addition, FIG. 5 illustrates the apparatuses connected via wires to one another, but the apparatuses can be instead wirelessly connected to one another. In addition, the electric vehicle control apparatus 100 does not need to serve as the master apparatus, and any of the electric vehicle control apparatuses 101 to 103 can operate as the master apparatus.

FIG. 6 illustrates internal configurations of the control units 30 related to the voltage oscillation reducing function. Although only the electric vehicle control apparatuses 100 and 101 are illustrated in FIG. 6 for convenience of description, the control units 30 of any other electric vehicle control apparatuses have the same configuration. The control unit 30 includes a voltage oscillation reducing unit 32, a vector control unit 34, and the cooperative control unit 40 described above.

The voltage value (hereinafter referred to as "capacitor voltage") Efc of the capacitor 50 is input to the voltage oscillation reducing unit 32. The voltage oscillation reducing unit 32 controls the inverter circuit 60 in such a way as to reduce fluctuation in the capacitor voltage Efc. Specifically, the voltage oscillation reducing unit 32 calculates a damping operation amount for reducing fluctuation in the capacitor voltage Efc, and controls a current command directed to the vector control unit 34, in accordance with the calculated damping operation amount. Note that a torque command may be controlled instead of the current command. The voltage oscillation reducing unit 32 controls the inverter circuit 60 such that inverter current changes in such a way as to reduce fluctuation in the capacitor voltage Efc. The inverter current is a current flowing through the inverter circuit 60. The voltage oscillation reducing function in the electric vehicle control apparatus is known as disclosed in, for example, Japanese Patent No. 4065901, and further detailed description thereof is omitted here. Note that the contents of that JP patent publication are incorporated herein by reference.

The vector control unit 34 generates voltage command values $v_u^*$, $v_v^*$, and $v_w^*$ on the basis of the current command controlled on the basis of the damping operation amount or the torque command controlled on the basis of the damping operation amount. In addition, on the basis of the voltage command values $v_u^*$, $v_v^*$, and $v_w^*$, the vector control unit 34 generates a PWM signal for performing PWM control on each semiconductor element of the inverter circuit 60. The inverter current is controlled by the PWM signal.

Examples of the PWM signal are shown in the lower part of FIG. 7. The symbol "UP" denotes a PWM signal for controlling the semiconductor element 60U of the U-phase upper arm of the inverter circuit 60. The symbol "UN" denotes a PWM signal for controlling the semiconductor element 60X of the U-phase lower arm of the inverter circuit 60. Similarly, the symbols "VP" and "VN" denote PWM signals for controlling the semiconductor element 60V of the V-phase upper arm and the semiconductor element 60Y of the V-phase lower arm, respectively. The symbols "WP" and "WN" denote PWM signals for controlling the semiconductor element 60W of the W-phase upper arm and the semiconductor element 60Z of the W-phase lower arm, respectively. As illustrated in the upper part of FIG. 7, these PWM signals can be generated on the basis of the magnitude relationship between the three-phase voltage command values $v_u^*$, $v_v^*$, and $v_w^*$ and a carrier.

Note that although FIG. 7 shows an example in which PWM signals are generated using a carrier, generation of PWM signals is not limited thereto. As will be discussed later, a processor can perform arithmetic processing for direct calculation, for example, to generate PWM signals.

In addition, regarding the voltage oscillation reducing function in the control unit 30, each control unit 30 can autonomously operate regardless of the presence or absence of the cooperation signal 112. Alternatively, the timing of the start of operation can be controlled by the cooperation signal 112. Performing such timing control makes it possible to reduce fluctuation in the capacitor voltage Efc due to a difference in operation timing between the electric vehicle control apparatuses.

(Instantaneous Power Control)

In general, the output of an AC motor is expressed by the product of a rotation frequency FM of the AC motor and an output torque Tm of the AC motor. Without the loss of the AC motor being taken into consideration, this product is equal to input power Pin of the inverter circuit that drives the AC motor. The following equation therefore holds true.

$$Pin = FM \times Tm \qquad (1)$$

The electric vehicle control apparatus 100, which is the master apparatus, transmits the cooperation signal 112 including information on the rotation frequency FM and the output torque Tm to the other electric vehicle control apparatuses 101 to 103. The other electric vehicle control apparatuses 101 to 103 perform control such that the same instantaneous powers pass through their inverter circuits 60 in accordance with equation (1) above on the basis of the information on the rotation frequency FM and the output torque Tm included in the cooperation signal 112. As a result, fluctuation in the voltages of the capacitors 50 can be reduced. Note that it is difficult to perform the instantaneous power control such that the same instantaneous powers pass through the electric vehicle control apparatuses at the same time. For this reason, a slight error is allowed. The margin of error is preferably in the range of ±10%, and is more preferably in the range of +5%.

In addition, it is known that in driving the AC motor, the inverter circuit connected to the LC filter circuit is operated to provide a positive resistance characteristic relative to fluctuation in the capacitor voltage, thereby stabilizing the control. The meaning of the positive resistance characteristic mentioned as used herein is expressed by the following equation.

$$Pin2 = n^2 \times Pin = n^2 \times FM \times Tm \qquad (2)$$

Each rotation frequency FM of the electric motors 80 to 83 is a value that changes in accordance with the speed of the electric vehicle. Meanwhile, in each of the electric vehicle control apparatuses 100 to 103 of the first embodiment, the resonance frequency of the LC filter circuit to be handled by the voltage oscillation reducing unit 32 is in the range of 10 Hz to 20 Hz. This range of the frequency can be converted into a period of 50 ms to 100 ms. This means that the oscillation period of the LC filter circuit can be regarded as a sufficiently short time relative to a change of the speed of the electric vehicle.

The rotation frequency FM of each of the electric motors 80 to 83 is thus taken as being constant in the control of the voltage oscillation reducing unit 32. When the capacitor voltage Efc is multiplied n-fold, therefore, the output torque Tm to be applied to the electric motors 80 to 83 is multiplied $n^2$-fold, thereby allowing the input power Pin of the inverter circuit 60 to change in proportion to the square of the change rate of the capacitor voltage Efc. That is, the torque command just needs to be multiplied by a value equal to the square of the change rate of the capacitor voltage Efc. This provides the inverter circuit 60 with a positive resistance characteristic relative to a fluctuation component of the capacitor voltage Efc, so that the electric oscillation of the LC filter circuit can be reduced, and the LC filter circuit can be stabilized.

As described above, in the electric vehicle drive system according to the first embodiment, the inverter circuit is housed in the housing together with the capacitor and the control unit. Furthermore, the reactor is connectable to each of a plurality of the housings through an electric wire having any desired length. In addition, at least one of the electric wires interconnecting the reactor and the housings has a length of 2 meters or more. As a result, the electric vehicle control apparatuses can be flexibly arranged in a limited space of the electric vehicle.

Second Embodiment

Figure 8:
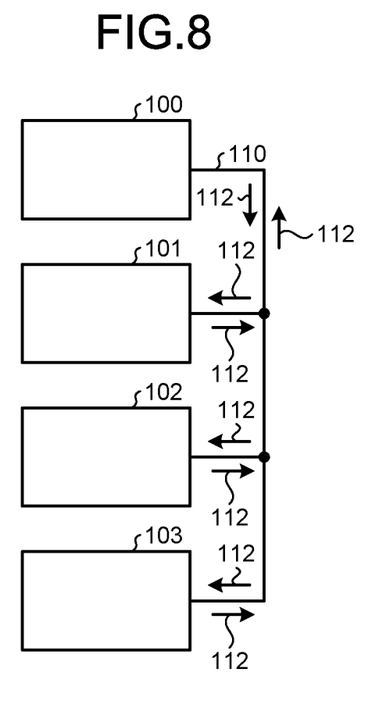
FIG. 8 is a diagram illustrating a flow of a cooperation signal in a second embodiment.

FIG. 8 is a diagram illustrating a flow of a cooperation signal in a second embodiment. As illustrated in FIG. 5, the flow of the cooperation signal 112 in the first embodiment is unidirectional, that is, unilateral, from the electric vehicle control apparatus 100 serving as the master apparatus to the other electric vehicle control apparatuses 101 to 103. In contrast, a flow of the cooperation signal 112 in the second embodiment is bidirectional. In FIG. 8, the electric vehicle control apparatuses 101 to 103 transmit the cooperation signal 112 including operation information, to the electric vehicle control apparatus 100 serving as a master apparatus. The operation information includes at least a switching frequency, a carrier frequency, a carrier phase, a modulation mode, and the capacitor voltage Efc. The switching frequency is a frequency at which each semiconductor element of the inverter circuit 60 switches on or off in accordance with a PWM signal. Examples of the modulation mode include an asynchronous mode, a synchronous multi-pulse mode, a synchronous three-pulse mode, and a one-pulse mode, which are known in the art.

The cooperative control unit 40 of the electric vehicle control apparatus 100 serving as the master apparatus grasps the operation conditions and operation states of the electric vehicle control apparatuses 101 to 103 on the basis of the operation information. Then, the cooperative control unit 40 of the electric vehicle control apparatus 100 generates the cooperation signal 112 including a command value of switching frequency, and transmits the cooperation signal 112 to the electric vehicle control apparatuses 101 to 103 so that switching frequencies for the apparatuses are equal to one another. The electric vehicle control apparatuses 101 to 103 cause the inverter circuits 60 to operate at the switching frequency specified by the master apparatus. As a result, each inverter circuit 60 operates at the same switching frequency. Therefore, fluctuation in the voltage of each capacitor 50 can be reduced. Note that as with other control parameters, a slight error is allowed. The margin of error is preferably in the range of ±10%, and is more preferably in the range of ±5%.

In addition, the cooperative control unit 40 of the electric vehicle control apparatus 100 generates the cooperation signal 112 including relevant command values, and transmits the cooperation signal 112 to the electric vehicle control apparatuses 101 to 103 so that there is no difference in carrier frequency, carrier phase, and modulation mode between the apparatuses. As a result, fluctuation in the voltages of the capacitors 50 can be reduced.

Figure 9:
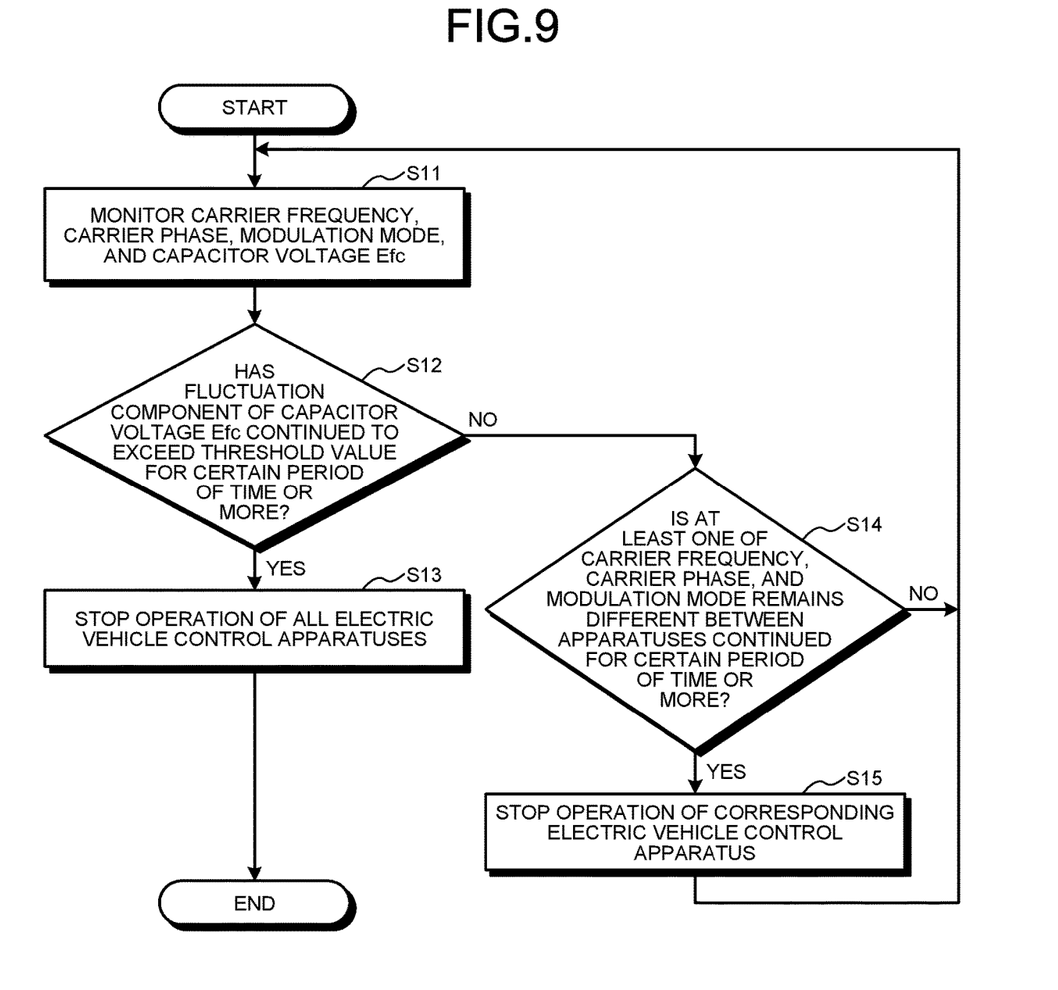
FIG. 9 is a flowchart for describing operation of protecting electric vehicle control apparatuses in the second embodiment.

Furthermore, the electric vehicle drive system according to the second embodiment performs the following protection operation. FIG. 9 is a flowchart for describing operation of protecting the electric vehicle control apparatuses in the second embodiment. Each step in the flowchart of FIG. 9 is performed under the control of the control unit 30 of the electric vehicle control apparatus 100 serving as the master apparatus.

The control unit 30 in each electric vehicle control apparatus monitors the carrier frequency, the carrier phase, the modulation mode, and the capacitor voltage Efc (step S11). Then, the control unit 30 in each electric vehicle control apparatus determines whether the fluctuation component of the capacitor voltage Efc has continued to exceed a threshold value for a certain period of time or more (step S12). When the fluctuation component of the capacitor voltage Efc has continued to exceed the threshold value for the certain period of time or more (step S12, Yes), the control unit 30 of the electric vehicle control apparatus 100 stops the operation of all the electric vehicle control apparatuses, that is, the electric vehicle control apparatuses 100 to 103 (step S13). Note that information on the monitoring performed in the control unit 30 is transmitted by the cooperation signal 112. Furthermore, instructions to stop the operation of the electric vehicle control apparatuses 101 to 103 are also transmitted by the cooperation signal 112.

When the fluctuation component of the capacitor voltage Efc has not continued to exceed the threshold value for the certain period of time or more (step S12, No), the control unit 30 in each electric vehicle control apparatus determines whether at least one of the carrier frequency, the carrier phase, and the modulation mode remains different between the apparatuses for a certain period of time or more (step S14). When at least one of the carrier frequency, the carrier phase, and the modulation mode remains different between the apparatuses for the certain period of time or more (step S14, Yes), the control unit 30 of the electric vehicle control apparatus 100 stops the operation of the corresponding electric vehicle control apparatus, that is, an electric vehicle control apparatus having continued to differ from the others for the certain period of time or more in at least one of the carrier frequency, the carrier phase, and the modulation mode (step S15). An instruction to stop the operation of the corresponding electric vehicle control apparatus is transmitted by the cooperation signal 112. After that, the processing from step S11 is repeated. In addition, the processing from step S11 is also repeated when a determination of "No" is made in step S14.

Note that FIG. 9 illustrates a flowchart in which the determination processing in step S14 is performed only when a determination of "No" is made in step S12, but the determination processing in step S12 and the determination processing in step S14 can be independently and concurrently performed. In such a case, a result of monitoring performed in step S11 is provided for the processing in step S12 and step S14 in parallel, and the processing from step S11 is repeated when a determination of "No" is made in S12. Furthermore, when a determination of "No" is made in step S14, the processing from step S11 is repeated. In addition, when a determination of "Yes" is made in step S14, the processing in step S15 is performed, following which the processing from step S11 is repeated.

Moreover, in the following description, the determination processing in step S12 and the determination processing in step S14 are referred to as a "first determination step" and a "second determination step", respectively where appropriate. Furthermore, the processing in step S13 and the processing in step S15 are referred to as a "first operation stopping step" and a "second operation stopping step", respectively where appropriate.

As described above, the electric vehicle control apparatus protecting method according to the second embodiment includes: a first determination step of determining whether a fluctuation component of a voltage of each capacitor has continued to exceed a threshold value for a certain period of time or more; and an operation stopping step of stopping operation of all the electric vehicle control apparatuses when a result of the determination in the first determination step is affirmative. As a result, the electric vehicle 150 can stop before the electric vehicle drive system 200 enters an anomalous state.

Furthermore, the electric vehicle control apparatus protecting method according to the second embodiment includes: a first determination step of determining whether a fluctuation component of a voltage of each capacitor has continued to exceed a threshold value for a certain period of time or more; a second determination step of, when a result of the determination in the first determination step is negative, determining whether at least one of the carrier frequency, the carrier phase, and the modulation mode remains different between the plurality of inverter circuits for a certain period of time or more; and an operation stopping step of stopping operation of the corresponding electric vehicle control apparatus when a result of the determination in the second determination step is affirmative. As a result, even when a part of the electric vehicle control apparatuses fail, the rest of the electric vehicle control apparatuses in good condition can continue operation of the electric vehicle.

Figure 10:
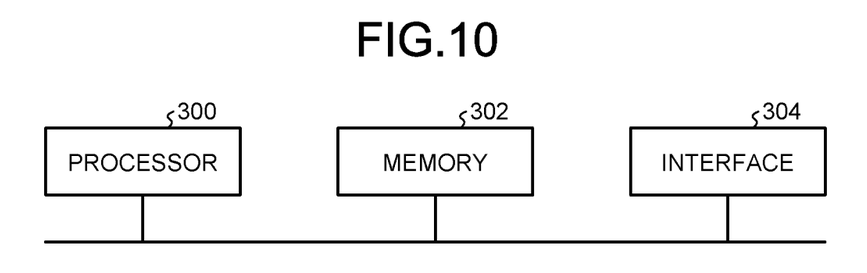
FIG. 10 is a block diagram showing an example of a hardware configuration that implements the function of the control unit in the first and second embodiments.
Figure 11:
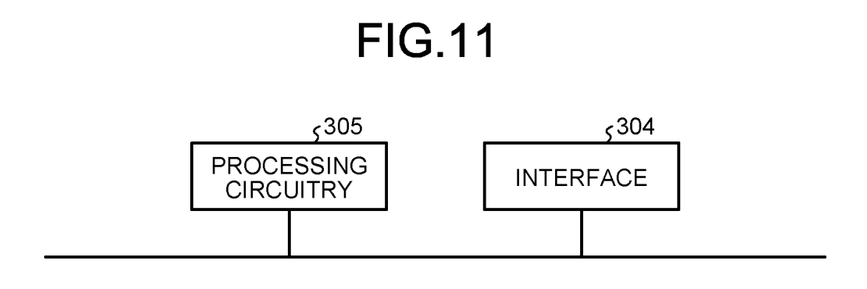
FIG. 11 is a block diagram showing another example of the hardware configuration that implements the function of the control unit in the first and second embodiments.

Next, a hardware configuration for implementing the function of the control unit 30 in the first and second embodiments will be described with reference to FIGS. 10 and 11. FIG. 10 is a block diagram showing an example of a hardware configuration that implements the function of the control unit in the first and second embodiments. FIG. 11 is a block diagram showing another example of the hardware configuration that implements the function of the control unit in the first and second embodiments.

In order to implement the function of the control unit 30 including the cooperative control unit 40 in the first embodiment, the control unit 30 can be configured to include a processor 300, a memory 302, and an interface 304, as illustrated in FIG. 10. The processor 300 performs operations. A program to be read by the processor 300 is stored in the memory 302. The interface 304 is used for inputting/outputting signals.

The processor 300 can be an arithmetic means such as an arithmetic unit, a microprocessor, a microcomputer, a central processing unit (CPU), or a digital signal processor (DSP). Furthermore, examples of the memory 302 include a non-volatile or volatile semiconductor memories such as a random access memory (RAM), a read only memory (ROM), a flash memory, an erasable programmable ROM (EPROM), and an electrically EPROM (EEPROM) (registered trademark), a magnetic disk, a flexible disk, an optical disk, a compact disc, a mini disc, and a digital versatile disc (DVD).

A program for executing the function of the control unit 30 in the first and second embodiments is stored in the memory 302. The processor 300 transmits and receives necessary information via the interface 304, executes the program stored in the memory 302, and consults a table stored in the memory 302, thereby performing the processing described above. The result of operation performed by the processor 300 can be stored in the memory 302.

Furthermore, the processor 300 and the memory 302 illustrated in FIG. 10 can be replaced with processing circuitry 305 as illustrated in FIG. 11. The processing circuitry 305 corresponds to a single circuit, a composite circuit, an application specific integrated circuit (ASIC), a field-programmable gate array (FPGA), or a combination thereof. Information can be input to and output from the processing circuitry 305 via the interface 304.

Note that the configuration illustrated in each of the above embodiments shows an example of the subject matter of the present invention, and it is possible to combine the configuration with another technique that is publicly known, and is also possible to omit or change part of the configuration without departing from the gist of the present invention.

REFERENCE SIGNS LIST 1 overhead line; 2 current collector; 3 wheel; 4 rail; 10 switch; 11 reactor; 20 electric wire; 21, 22, 23, 24 inductance; 30 control unit; 32 voltage oscillation reducing unit; 34 vector control unit; 40 cooperative control unit; 50 capacitor; 52 discharge circuit; 54 resonance circuit; 60 inverter circuit; 60U, 60V, 60W, 60X, 60Y, 60Z semiconductor element; 80, 81, 82, 83 electric motor; 100, 101, 102, 103 electric vehicle control apparatus; 110 communication line; 112 cooperation signal; 150, 150A electric vehicle; 200 electric vehicle drive system; 250, 252, 254, 256, 500A housing; 300 processor; 302 memory; 304 interface; 305 processing circuitry.

The invention claimed is:

1. An electric vehicle drive system comprising:
a reactor;
a plurality of electric vehicle control apparatuses to control electric motors to drive an electric vehicle; and
a plurality of housings equipped with the electric vehicle control apparatuses and having first terminals and second terminals,
wherein each of the electric vehicle control apparatuses includes:
a capacitor connected to the reactor, the capacitor and the reactor defining a filter circuit;
an inverter circuit to supply power to the electric motor, the inverter circuit being connected to the filter circuit; and
control circuitry to control the inverter circuit,
the inverter circuit is housed in a corresponding one of the housings together with the capacitor and the control circuitry, and
each of the first terminals is connected to one end of the capacitor of a corresponding one of the electric vehicle control apparatuses and each of the second terminals is connected to another end of the capacitor of the corresponding one of the electric vehicle control apparatuses, the first terminal of the housing of one electric control vehicle apparatus of the plurality of electric control vehicle apparatuses is connected in parallel with the first terminals of the housings of other electric control vehicle apparatuses of the plurality of electric control vehicle apparatuses through electric wires and the second terminal of the housing of the one electric vehicle control apparatus of the plurality of electric control vehicle apparatuses is connected in parallel with the second terminals of the housings of other electric vehicle control vehicle apparatuses of the plurality of electric vehicle control apparatuses through electric wires, each of the first terminals of the housings of the electric vehicle control apparatuses being connected through a corresponding one of the electric wires to the reactor without the first terminal of the housing of any other electric vehicle control apparatus being interposed therebetween, the reactor is connectable to each housing of each electric vehicle control vehicle apparatus through the electric wires having desired lengths, and at least one of the electric wires interconnecting the reactor and the housings has a length of 2 meters or more.

2. The electric vehicle drive system according to claim 1, wherein
the capacitors of the plurality of electric vehicle control apparatuses are equal to one another in capacitance.

3. The electric vehicle drive system according to claim 1, wherein
the control circuitry includes oscillation reducing circuitry to reduce voltage oscillation of the capacitor.

4. The electric vehicle drive system according to claim 3, wherein
the cooperative control circuit is configured to share information with the other electric vehicle control apparatuses and operate cooperatively therewith.

5. The electric vehicle drive system according to claim 4, wherein
the one or another of the cooperative control circuits controls a plurality of the inverter circuits such that the same instantaneous powers pass through the inverter circuits.

6. The electric vehicle drive system according to claim 4, wherein
the one or another of the cooperative control circuits performs control such that switching frequencies of a plurality of the inverter circuits are equal to one another.

7. The electric vehicle drive system according to claim 6, wherein
the one or another of the cooperative control circuits performs control such that there is no difference in the carrier frequency, the carrier phase, and the modulation mode between the plurality of inverter circuits.

8. A method for protecting the plurality of electric vehicle control apparatuses included in the electric vehicle drive system according to claim 6, the method comprising:
determining whether a fluctuation component of a voltage of each capacitor has continued to exceed a threshold value for a certain period of time or more; and stopping operation of all the electric vehicle control apparatuses when the fluctuation component has continued to exceed the threshold value for the certain period of time or more.

9. A method for protecting the plurality of electric vehicle control apparatuses included in an electric vehicle drive system including:
a reactor; and
a plurality of electric vehicle control apparatuses to control electric motors to drive an electric vehicle,
wherein each of the electric vehicle control apparatuses includes:
a capacitor connected to the reactor, the capacitor and the reactor defining a filter circuit;
an inverter circuit to supply power to the electric motor, the inverter circuit being connected to the filter circuit; and
control circuitry to control the inverter circuit,
the inverter circuit is housed in a housing together with the capacitor and the control circuitry,
the reactor is connectable in parallel to each of a plurality of the housings through an electric wire having any desired length, and
at least one of the electric wires interconnecting the reactor and the housings has a length of 2 meters or more, wherein:
the control circuitry includes oscillation reducing circuitry to reduce voltage oscillation of the capacitor,
the control circuitry includes a cooperative control circuit to share information with the other electric vehicle control apparatuses and operate cooperatively therewith,
one of the cooperative control circuits of the plurality of electric vehicle control apparatuses performs control such that switching frequencies of a plurality of the inverter circuits are equal to one another, and
one of the cooperative control circuits of the plurality of electric vehicle control apparatuses performs control such that there is no difference in carrier frequency, carrier phase, and modulation mode between the plurality of inverter circuits, the method comprising:
determining whether a fluctuation component of a voltage of each capacitor has continued to exceed a threshold value for a certain period of time or more;
a second determination step of, when the fluctuation component has not continued to exceed the threshold value for the certain period of time or more, determining whether at least one of the carrier frequency, the carrier phase, and the modulation mode remains different between the plurality of inverter circuits for a certain period of time or more; and
an operation stopping step of stopping operation of a corresponding electric vehicle control apparatus when the at least one of the carrier frequency, the carrier phase, and the modulation mode remains different between the inverter circuits for the certain period of time or more.

10. An electric vehicle drive system comprising:
a reactor;
a plurality of electric vehicle control apparatuses to control electric motors to drive an electric vehicle; and
a plurality of housings equipped with the electric vehicle control apparatuses and having first terminals and second terminals, the first terminals being identical in potential to each other, the second terminals being identical in potential to each other, wherein each of the electric vehicle control apparatuses includes:

a capacitor connected to the reactor, the capacitor and the reactor defining a filter circuit;

an inverter circuit to supply power to the electric motor, the inverter circuit being connected to the filter circuit; and control circuitry to control the inverter circuit, the inverter circuit is housed in a corresponding one of the housings together with the capacitor and the control circuitry, and each of the first terminals is connected to one end of the capacitor of a corresponding one of the electric vehicle control apparatuses and each of the second terminals is connected to another end of the capacitor of the corresponding one of the electric vehicle control apparatuses, the first terminal of the housing of one electric control vehicle apparatus of the plurality of electric control vehicle apparatuses is connected in parallel with the first terminals of the housings of other electric control vehicle apparatuses of the plurality of electric control vehicle apparatuses through electric wires and the second terminal of the housing of the one electric vehicle control apparatus of the plurality of electric vehicle control vehicle apparatuses is connected in parallel with the second terminals of the housings of other electric vehicle control vehicle apparatuses of the plurality of electric vehicle control apparatuses through electric wires, the reactor is connectable to each housing of each electric vehicle control vehicle apparatus through the electric wires having desired lengths, and at least one of the electric wires interconnecting the reactor and the housings has a length of 2 meters or more.

* * * * *